United States Patent
Chen et al.

(10) Patent No.: US 9,790,363 B2
(45) Date of Patent: Oct. 17, 2017

(54) POLYESTER-POLYCARBONATE COMPOSITION AND ARTICLE

(71) Applicant: SABIC Global Technologies B.V., Bergen op Zoom (NL)

(72) Inventors: Lin Chen, Shanghai (CN); Bing Guan, Shanghai (CN); Huanbing Wang, Shanghai (CN); Dongbo Xing, Shanghai (CN); Shun Wan, Shanghai (CN); Dake Shen, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 15/109,835

(22) PCT Filed: Feb. 13, 2015

(86) PCT No.: PCT/IB2015/051082
§ 371 (c)(1),
(2) Date: Jul. 6, 2016

(87) PCT Pub. No.: WO2015/128768
PCT Pub. Date: Sep. 3, 2015

(65) Prior Publication Data
US 2016/0362549 A1    Dec. 15, 2016

Related U.S. Application Data

(63) Continuation of application No. 14/191,488, filed on Feb. 27, 2014, now abandoned.

(51) Int. Cl.
| | |
|---|---|
| *C08K 5/52* | (2006.01) |
| *C08L 69/00* | (2006.01) |
| *C08L 83/10* | (2006.01) |
| *C08G 77/448* | (2006.01) |

(52) U.S. Cl.
CPC ............. *C08L 69/00* (2013.01); *C08L 69/005* (2013.01); *C08L 83/10* (2013.01); *C08G 77/448* (2013.01); *C08L 2201/02* (2013.01); *C08L 2201/08* (2013.01); *C08L 2205/025* (2013.01); *C08L 2205/035* (2013.01); *C08L 2207/53* (2013.01)

(58) Field of Classification Search
CPC ........ C08L 69/00; C08L 69/005; C08L 83/10; C08L 2207/53; C08L 2205/035; C08L 2201/02; C08L 2205/025; C08L 2205/02; C08L 2201/08
USPC ......................................................... 524/127
See application file for complete search history.

(56) References Cited

U.S. PATENT DOCUMENTS

| | | |
|---|---|---|
| 3,419,634 A | 12/1968 | Vaughn |
| 3,419,635 A | 12/1968 | Vaughn |
| 3,821,325 A | 6/1974 | Merritt, Jr., et al. |
| 3,832,419 A | 8/1974 | Merritt, Jr. |
| 3,994,988 A | 11/1976 | Laurin |
| 6,072,011 A | 6/2000 | Hoover |
| 6,559,270 B1 * | 5/2003 | Siclovan ............... C08G 63/64 528/196 |
| 6,583,256 B2 | 6/2003 | Vollenberg et al. |
| 6,590,015 B1 | 7/2003 | Eckel et al. |
| 7,060,217 B2 | 6/2006 | Dunton et al. |
| 7,169,859 B2 | 1/2007 | Davis et al. |
| 7,452,944 B2 | 11/2008 | Gallucci et al. |
| 7,498,398 B2 | 3/2009 | Di et al. |
| 7,605,221 B2 | 10/2009 | Davis et al. |
| 7,652,083 B2 | 1/2010 | Mullen |
| 7,652,107 B2 | 1/2010 | Gallucci et al. |
| 7,691,950 B2 | 4/2010 | Chakravarti et al. |
| 7,790,292 B2 | 9/2010 | Colborn et al. |
| 7,829,632 B2 | 11/2010 | Chakravarti et al. |
| 7,932,310 B2 | 4/2011 | Gallucci et al. |
| 8,263,691 B2 | 9/2012 | Gallucci et al. |
| 2001/0016626 A1 | 8/2001 | Vollenberg et al. |
| 2007/0142569 A1 | 6/2007 | Donovan et al. |
| 2007/0149629 A1 | 6/2007 | Donovan et al. |
| 2007/0155913 A1 | 7/2007 | Chakravarti et al. |
| 2008/0269400 A1 * | 10/2008 | Chakravarti ............ C08L 67/02 524/539 |
| 2009/0062438 A1 | 3/2009 | Van De Grampel et al. |
| 2013/0317150 A1 | 11/2013 | Wan et al. |
| 2015/0240074 A1 | 8/2015 | Chen et al. |

FOREIGN PATENT DOCUMENTS

| | | | |
|---|---|---|---|
| CN | 1331711 A | 1/2002 | |
| CN | WO 2012058821 A1 * | 5/2012 | ............. C08L 67/02 |
| CN | 103282433 A | 9/2013 | |

(Continued)

OTHER PUBLICATIONS

Final Office Action dated Jun. 4, 2015; U.S. Appl. No. 14/191,488, filed Feb. 27, 2014 (7 pages).
Notice of Abandonment dated Jan. 5, 2016; U.S. Appl. No. 14/191,488, filed Feb. 27, 2014 (2 pages).
Notice of Abandonment dated Mar. 19, 2014; U.S. Appl. No. 14/185,304, filed Feb. 20, 2014 (2 pages).
Demirel, B. et al., "Crystallization Behavior of PET Materials", BAU Fen Bil. Enst. Dergisi Cilt, 2011, vol. 13, No. 1, pp. 26 35.
International Search Report dated Jun. 8, 2015; International Application No. PCT/IB2015/051082; International Filing Date Feb. 13, 2015 (4 pages).
Li, X. "Environmental stress cracking resistance of a new copolymer of bisphenol-A", Polymer Degradation and Stability, 2005, vol. 90, pp. 44-52.
Non-Final Office Action dated Feb. 26, 2015; U.S. Appl. No. 14/191,488, filed Feb. 27, 2014 (13 pages).

(Continued)

*Primary Examiner* — Hui Chin
(74) *Attorney, Agent, or Firm* — Cantor Colburn LLP

(57) ABSTRACT

A composition includes specific amounts of an aromatic polycarbonate, a block polycarbonate-polysiloxane, a poly (alkylene terephthalate), a block polyestercarbonate, and an organophosphate ester. Relative to a corresponding composition lacking the block polyestercarbonate, the composition exhibits improved solvent resistance while substantially maintaining impact strength, melt flow, and flame retardancy. The composition is useful for fabricating articles that may come into contact with liquid chemicals or chemical vapors.

16 Claims, No Drawings

(56) References Cited

FOREIGN PATENT DOCUMENTS

| EP | 0992542 A1 | 4/2000 |
|----|------------|--------|
| WO | 2008091253 A1 | 7/2008 |
| WO | 2012058821 A1 | 5/2012 |
| WO | 2013109377 A1 | 7/2013 |

OTHER PUBLICATIONS

SABIC Innovative Plastics Lexam EXL Resin brochure, 2008, 24 pages.
Written Opinion dated Jun. 8, 2015; International Application No. PCT/IB2015/051082; International Filing Date Feb. 13, 2015 (5 pages).
Chinese Office Action for application No. 201580011031.X issued Apr. 5, 2017 (7 pages).

\* cited by examiner

POLYESTER-POLYCARBONATE COMPOSITION AND ARTICLE

CROSS REFERENCE TO RELATED APPLICATIONS

This application is a National Stage application of PCT/IB2015/051082, filed 02/13/2015, which claims the benefit of U.S. Nonprovisional Application Ser. No. 14/191,488, filed 02/27/2014(currently abandoned), both of which are incorporated by reference in their entirety herein.

BACKGROUND OF THE INVENTION

Polycarbonate is an engineering plastic widely used in various applications due to its good heat resistance, impact resistance, and transparency. Polycarbonate's ability to self-char during combustion makes it especially suitable for uses in which flame retardancy is needed, for example in housing parts for electrical and electronic devices. However, in applications in which it comes into direct contact with chemicals, such as in office equipment and kitchen equipment, polycarbonate-based materials can exhibit environmental stress cracking (ESC) due to their relatively poor chemical resistance.

Incorporating thermoplastic polyesters into the polycarbonate compositions has been demonstrated to improve chemical resistance. See, e.g., European Patent No. 0 992 542 B1 to Matsumoto, and U.S. Pat. No. 6,590,015 B1 to Eckel et al. However, flame retardancy and impact strength are both compromised by the addition of thermoplastic polyester. And attempts to compensate for reduced flame retardancy by the addition of organophosphate esters yield undesirable decreases in heat resistance and impact strength. International Patent Application Publication No. WO 2012/058821 A1 of Wan et al. describes a polycarbonate-polyester molding composition incorporating an "organopolysiloxane-polycarbonate block copolymer". That composition exhibits a desirable balance of mechanical properties, flame retardancy, and melt flow. But the composition's chemical resistance is inadequate for some applications with chemical exposure. There remains a need for polycarbonate-polyester blends exhibiting improved chemical resistance while substantially maintaining impact strength, melt flow, heat resistance, and flame retardancy.

BRIEF SUMMARY OF EMBODIMENTS OF THE INVENTION

One embodiment is a composition comprising, based on the total weight of the composition, 5 to 50 weight percent of an aromatic polycarbonate; 10 to 40 weight percent of a block polycarbonate-polysiloxane; 5 to 35 weight percent of a poly(alkylene terephthalate); 5 to 50 weight percent of a block polyestercarbonate comprising a polyester block comprising resorcinol ester repeat units having the structure

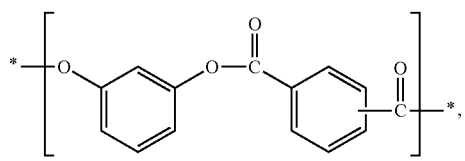

and a polycarbonate block comprising carbonate repeat units having the structure

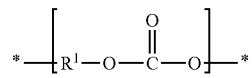

wherein at least 60 percent of the total number of $R^1$ groups are aromatic; and 4 to 20 weight percent of an organophosphate ester.

Another embodiment is an article comprising the composition.

These and other embodiments are described in detail below.

DETAILED DESCRIPTION OF THE INVENTION

The present inventors have determined that improved chemical resistance is exhibited by a composition that includes specific amounts of an aromatic polycarbonate, a block polycarbonate-polysiloxane, a poly(alkylene terephthalate), a block polyestercarbonate, and an organophosphate ester. The improved chemical resistance is achieved while substantially maintaining impact strength, melt flow, heat resistance, and flame retardancy. Thus, one embodiment is a composition comprising, based on the total weight of the composition, 5 to 50 weight percent of an aromatic polycarbonate; 10 to 40 weight percent of a block polycarbonate-polysiloxane; 5 to 35 weight percent of a poly(alkylene terephthalate); 5 to 50 weight percent of a block polyestercarbonate comprising a polyester block comprising resorcinol ester repeat units having the structure

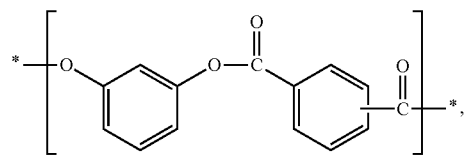

and a polycarbonate block comprising carbonate repeat units having the structure

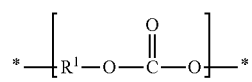

wherein at least 60 percent of the total number of $R^1$ groups are aromatic; and 4 to 20 weight percent of an organophosphate ester.

The composition includes an aromatic polycarbonate. "Polycarbonate" as used herein means a polymer or copolymer having repeating structural carbonate units of the formula

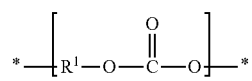

wherein at least 60 percent of the total number of $R^1$ groups are aromatic. Specifically, each $R^1$ can be derived from a dihydroxy compound such as an aromatic dihydroxy compound of the formula

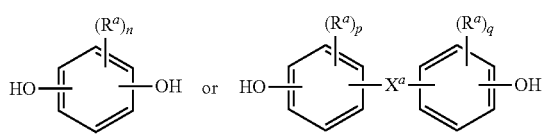

wherein n, p, and q are each independently 0, 1, 2, 3, or 4; $R^a$ is independently at each occurrence halogen, or unsubstituted or substituted $C_{1-10}$ hydrocarbyl; and $X^a$ is a single bond, —O—, —S—, —S(O)—, —S(O)$_2$—, —C(O)—, or a $C_{1-18}$ hydrocarbylene, which can be cyclic or acyclic, aromatic or non-aromatic, and can further comprise one or more heteroatoms selected from halogens, oxygen, nitrogen, sulfur, silicon, or phosphorous. As used herein, the term "hydrocarbyl", whether used by itself, or as a prefix, suffix, or fragment of another term, refers to a residue that contains only carbon and hydrogen unless it is specifically identified as "substituted hydrocarbyl". The hydrocarbyl residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. So, when the hydrocarbyl residue is described as substituted, it can contain heteroatoms in addition to carbon and hydrogen.

Some illustrative examples of specific dihydroxy compounds include the following: bisphenol compounds such as 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane,1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, and 2,3,5,6-tetrabromo hydroquinone.

Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane (DMBPC), 1,1-bis(4-hydroxy-3-methylphenyl)-3,3,5-trimethylcyclohexane (isophorone bisphenol), and combinations thereof.

In some embodiments, at least 90 percent of the total number of $R^1$ groups in the polycarbonate have the formula

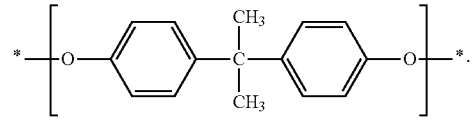

In some embodiments, the polycarbonate comprises or consists of bisphenol A polycarbonate resin.

More than one polycarbonate can be used. For example, the composition can comprise a first polycarbonate having a weight average molecular weight of 18,000 to 25,000 atomic mass units and a second polycarbonate having a weight average molecular weight of 27,000 to 35,000 atomic mass units.

Methods of forming polycarbonates are known, and many are commercially available from suppliers including SABIC Innovative Plastics, Bayer MaterialScience, and Mitsubishi Chemical Corp.

The composition comprises the polycarbonate in an amount of 5 to 50 weight percent, based on the total weight of the composition. Within this range, the polycarbonate amount can be 10 to 40 weight percent, specifically 15 to 36 weight percent.

In addition to the aromatic polycarbonate, the composition comprises a block polycarbonate-polysiloxane. A block polycarbonate-polysiloxane is a polycarbonate copolymer comprising at least one polycarbonate block and at least one polysiloxane block. In some embodiments, the block polycarbonate-polysiloxane comprises multiple polycarbonate blocks and multiple polysiloxane blocks. The block polycarbonate-polysiloxane can be transparent, translucent, or opaque, depending on its composition.

Block polycarbonate-polysiloxanes and methods for their preparation are known and described, for example, in U.S. Pat. Nos. 3,419,634 and 3,419,635 to Vaughn, U.S. Pat. No. 3,821,325 to Merritt et al., U.S. Pat. No. 3,832,419 to Merritt, and U.S. Pat. No. 6,072,011 to Hoover. Block polycarbonate-polysiloxanes are also commercially available as LEXAN™ EXL resins from SABIC Innovative Plastics.

In some embodiments, each of the at least one polysiloxane blocks of the copolymer comprises diorganosiloxane units of the formula

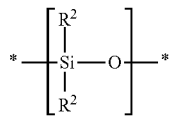

wherein each occurrence of $R^2$ is independently $C_{1-13}$ hydrocarbyl. Examples of suitable hydrocarbyl groups include $C_1$-$C_{13}$ alkyl (including alkyl groups that are linear, branched, cyclic, or a combination of at least two of the foregoing), $C_2$-$C_{13}$ alkenyl, $C_6$-$C_{12}$aryl $C_7$-$C_{13}$ arylalkyl, and $C_7$-$C_{13}$ alkylaryl. The foregoing hydrocarbyl groups can, optionally, be fully or partially halogenated with fluorine, chlorine, bromine, iodine, or a combination of at least two of the foregoing. In some embodiments, including embodiments in which a transparent block polycarbonate-polysiloxane is desired, $R^2$ is unsubstituted by halogen.

The polysiloxane blocks can each comprise 2 to 1,000 diorganosiloxane units. Within this range, the number of diorganosiloxane units can be 2 to 500, more specifically 5 to 100. In some embodiments, the number of diorganosiloxane repeat units in each block is 10 to 75, specifically 40 to 60.

In some embodiments, the polysiloxane block has the formula

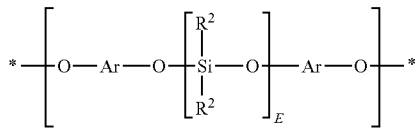

wherein $R^2$ is defined above; E is 2 to 1,000, specifically 2 to 500, more specifically 5 to 100, still more specifically 10 to 75, even more specifically 40 to 60; and each occurrence of Ar is independently an unsubstituted or substituted $C_6$-$C_{30}$ arylene group, wherein aromatic carbon atoms of the arylene group is directly bonded to each adjacent oxygen atom. Ar groups can be derived from a $C_6$-$C_{30}$ dihydroxyarylene compound, for example a dihydroxyarylene compound of formula

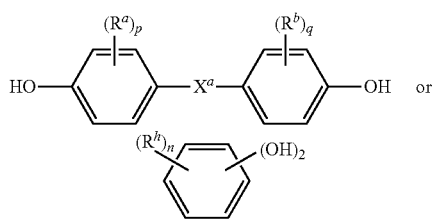

wherein $R^a$, $R^b$, $R^h$, $X^a$, p, and q are defined above. Examples of dihydroxyarylene compounds include hydroquinone, resorcinol, 1,1-bis(4-hydroxyphenyl)methane, 1,1-bis(4-hydroxyphenyl)ethane, 2,2-bis(4-hydroxyphenyl)propane (bisphenol A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane.

In some embodiments, the polysiloxane block has the formula

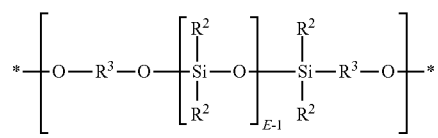

wherein $R^2$ and E are as defined above, and each occurrence of $R^3$ is independently (divalent) $C_1$-$C_{30}$ hydrocarbylene.

In a specific embodiment, the polysiloxane blocks have the formula

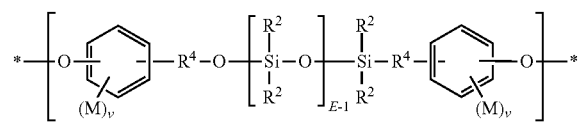

wherein $R^2$ and E are as defined above; each occurrence of $R^4$ is independently a divalent $C_2$-$C_8$ aliphatic group; each occurrence of M is independently halogen, cyano, nitro, $C_1$-$C_8$ alkyl, $C_1$-$C_8$ alkoxyl, $C_1$-$C_8$ alkylthio, $C_2$-$C_8$ alkenyl, $C_2$-$C_8$ alkenyloxyl group, $C_6$-$C_{10}$ aryl, $C_6$-$C_{10}$ aryloxyl, $C_7$-$C_{12}$ arylalkyl, $C_7$-$C_{12}$ arylalkoxyl, $C_7$-$C_{12}$ alkylaryl, or $C_7$-$C_{12}$ alkylaryloxyl; and each occurrence of v is independently 0, 1, 2, 3, or 4. In some embodiments, at least one occurrence of v is not zero, and each associated occurrence of M is independently chloro, bromo, $C_1$-$C_6$ alkyl (including methyl, ethyl, and n-propyl), $C_1$-$C_6$ alkoxyl (including methoxyl, ethoxyl, and propoxyl), or $C_6$-$C_{12}$ aryl or alkylaryl (including phenyl, chlorophenyl, and tolyl); each occurrence of $R^4$ is independently $C_2$-$C_4$ alkylene (including dimethylene, trimethylene, and tetramethylene); and $R^2$ is $C_1$-$C_8$ alkyl, $C_1$-$C_8$ haloalkyl (including 3,3,3-trifluoropropyl), $C_1$-$C_8$ cyanoalkyl, or $C_6$-$C_{12}$ aryl or alkylaryl (including phenyl, chlorophenyl, and tolyl). In some embodiments, each occurrence of $R^2$ is independently methyl, 3,3,3-trifluoropropyl, or phenyl. In some embodiments, all the occurrences of $R^2$ collective include at least one methyl and at least one 3,3,3-trifluoropropyl.

In some embodiments, the two occurrences of $R^2$ attached to a silicon atom include at least one methyl and at least one phenyl. In some embodiments, each occurrence of v is 1, each occurrence of M is methoxyl, $R^4$ is a divalent $C_1$-$C_3$ alkylene group, and each occurrence of $R^2$ is methyl.

Blocks having the formula

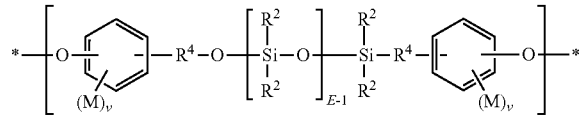

can be derived from the corresponding dihydroxy polysiloxane having the formula

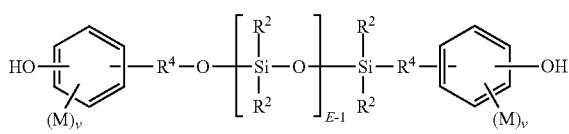

wherein E, v, $R^4$, $R^6$, and M are defined above. Such dihydroxy polysiloxanes can be prepared by a platinum-catalyzed reaction of an aliphatically unsaturated monohydric phenol with a polysiloxane hydride of the formula

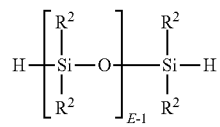

wherein E, and $R^2$ are defined above. Examples of aliphatically unsaturated monohydric phenols include 2-methoxy-4-allyl-phenol (eugenol), 2-allylphenol, 2-methyl-4-allyl-phenol, 2-allyl-4-methylphenol, 4-allyl-2-phenylphenol, 4-allyl-2-bromophenol, 4-allyl-2-t-butoxyphenol, 4-allyl-2-phenylphenol, 2-allyl-4-propylphenol, 2-allyl-4,6-dimethyl-phenol, 2-allyl-4-bromo-6-methylphenol, 2-allyl-6-methoxy-4-methylphenol, 2-allyl-4,6-dimethylphenol, and combinations of at least two of the foregoing.

The at least one polycarbonate block of the block polycarbonate-polysiloxane comprises carbonate units of the formula

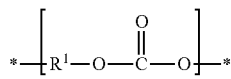

wherein at least 60 percent of the total number of $R^1$ groups are aromatic, and various specific embodiments of $R^1$ are described above.

In some embodiments, the block polycarbonate-polysiloxane comprises, based on the weight of the block polycarbonate-polysiloxane, 70 to 97 weight percent carbonate units and 3 to 30 weight percent of diorganosiloxane units. Within this range, the block polycarbonate-polysiloxane can comprise 70 to 90 weight percent, specifically 75 to 85 weight percent, of carbonate units, and 10 to 30 weight percent, specifically 15 to 25 weight percent of diorganosiloxane units.

In some embodiments, the block polycarbonate-polysiloxane has a weight average molecular weight of 2,000 to 100,000 atomic mass units, specifically 5,000 to 50,000 atomic mass units, as determined by gel permeation chromatography using a crosslinked styrene-divinyl benzene column, a sample concentration of 1 milligram per milliliter, and bisphenol A polycarbonate standards.

In some embodiments, the block polycarbonate-polysiloxane has a melt volume flow rate, measured at 300° C. and 1.2 kilogram load according to ASTM D1238-04, of 1 to 50 cubic centimeters per 10 minutes, specifically 2 to 30 cubic centimeters per 10 minutes, more specifically 3 to 20 cubic centimeters per 10 minutes. Mixtures of block polycarbonate-polysiloxanes of different flow properties can be used to achieve desired flow properties for the composition as a whole.

In a very specific embodiment, the block polycarbonate-polysiloxane comprises, based on the weight of the block polycarbonate-polysiloxane, 10 to 30 weight percent of dimethylsiloxane units, and 70 to 90 weight percent of carbonate units of the formula

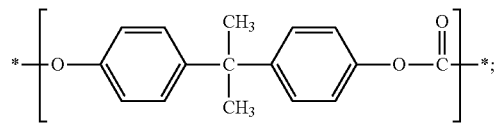

and the block polycarbonate-polysiloxane has a melt volume flow rate of 3 to 20 centimeter³/10 minutes measured at 300° C. and 1.2 kilogram load according to ASTM D1238-04. The carbonate units can be present in a single polycarbonate block, or distributed among multiple polycarbonate blocks. In some embodiments, the carbonate units are distributed among at least two polycarbonate blocks.

In another very specific embodiment, the block polycarbonate-polysiloxane has the formula

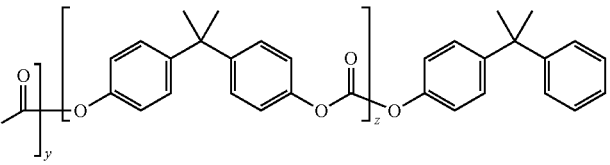

wherein x, y, and z are such that the block copolymer has 10 to 30 weight percent, specifically 15 to 25 weight percent, of polydimethylsiloxane units. In some embodiments, x is, on average, 30 to 60, specifically 30 to 56; y is on average 1 to 5, specifically 1 to 3; and z is on average 70 to 130, specifically 80 to 100. T is a divalent $C_3$–$C_{30}$ linking group, specifically a hydrocarbyl group which can be aliphatic, aromatic, or a combination of aromatic and aliphatic and can contain one or more heteroatoms including oxygen. A wide variety of linking groups and combinations thereof can be used. The T group can be derived from a eugenol or allyl end-capping agent on the polysiloxane chain. Other end-capping agents, in addition to eugenol, include aliphatically unsaturated monohydric phenols such as 2-allyl phenol and 4-allyl-2-methylphenol. The carbonate units can be present in a single polycarbonate block, or distributed among multiple polycarbonate blocks. In some embodiments, the carbonate units are distributed among at least two polycarbonate blocks.

In another very specific embodiment, the block polycarbonate-polysiloxane has the formula

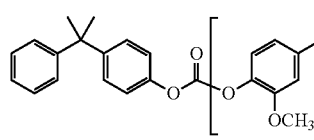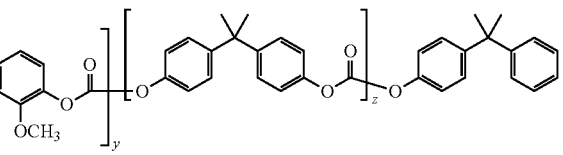

wherein x, y, and z are such that the block copolymer has 10 to 30 weight percent, specifically 15 to 25 weight percent, of polydimethylsiloxane units. In some embodiments, x is, on average, 30 to 60, specifically 30 to 56; y is on average 1 to 5, specifically 1 to 3; and z is on average 70 to 130, specifically 80 to 100. The carbonate units can be present in a single polycarbonate block, or distributed among multiple polycarbonate blocks. In some embodiments, the carbonate units are distributed among at least two polycarbonate blocks.

The composition comprises the block polycarbonate-polysiloxane in an amount of 10 to 40 weight percent, based on the total weight of the composition. Within this range, the block polycarbonate-polysiloxane amount can be 15 to 35 weight percent, specifically 20 to 30 weight percent.

In addition to the aromatic polycarbonate and the block polycarbonate-polysiloxane, the composition comprises a poly(alkylene terephthalate). The alkylene group of the poly(alkylene terephthalate) can comprise 2 to 18 carbon atoms. Examples of alkylene groups are ethylene, 1,3-propylene, 1,4-butylene, 1,5-pentylene, 1,6-hexylene, 1,4-cyclohexylene, 1,4-cyclohexanedimethylene, and combinations thereof. In some embodiments, the alkylene group comprises ethylene, 1,4-butylene, or a combination thereof, and the poly(alkylene terephthalate comprises poly(ethylene terephthalate), poly(butylene terephthalate), or a combination thereof, respectively. In some embodiments, the alkylene group comprises 1,4-butylene and the poly(alkylene terephthalate) comprises poly(butylene terephthalate).

The poly(alkylene terephthalate) can also be a copolyester derived from terephthalic acid (or a combination of terephthalic acid and isophthalic acid) and a mixture comprising a linear $C_2$-$C_6$ aliphatic diol, such as ethylene glycol and/or 1,4-butylene glycol), and a $C_6$-$C_{12}$ cycloaliphatic diol, such as 1,4-cyclohexane diol, 1,4-cyclohexanedimethanol, dimethanol decalin, dimethanol bicyclooctane, 1,10-decane diol, or a combination thereof. The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mole percent of the ester groups are derived from 1,4-cyclohexanedimethanol; and poly(ethylene-co-1,4-cyclohexylenedimethylene terephthalate) wherein greater than 50 mole percent of the ester groups are derived from ethylene (PETG).

It will be understood that the poly(alkylene terephthalate) can include small amounts (e.g., up to 10 weight percent, specifically up to 5 weight percent) of residues of monomers other than alkylene diols and terephthalic acid. For example, the poly(alkylene terephthalate) can include the residue of isophthalic acid. As another example, the poly(alkylene terephthalate) can comprises units derived from an aliphatic acid, such as succinic acid, glutaric acid, adipic acid, pimelic acid, 1,4-cyclohexanedicarboxylic acid, and combinations thereof.

In some embodiments, the poly(alkylene terephthalate) is poly(1,4-butylene terephthalate) or "PBT" resin that is obtained by polymerizing a glycol component comprising at least 70 mole percent, specifically at least 80 mole percent, of tetramethylene glycol (1,4-butanediol), and an acid component comprising at least 70 mole percent, specifically at least 80 mole percent, terephthalic acid or polyester-forming derivatives therefore. Commercial examples of PBT include those available under the trade names VALOX™ 315 and VALOX™ 195, manufactured by SABIC Innovative Plastics.

In some embodiments, the poly(alkylene terephthalate) has an intrinsic viscosity of 0.4 to 2.0 deciliter/gram (dl/g), as measured in a 60:40 phenol/tetrachloroethane mixture at 23° C. In some embodiments, the poly(alkylene terephthalate) has an intrinsic viscosity of 0.5 to 1.5 dl/g, specifically 0.6 to 1.2 dl/g.

In some embodiments, the poly(alkylene terephthalate) has a weight average molecular weight of 10,000 to 200,000 atomic mass units, specifically 50,000 to 150,000 atomic mass units, as measured by gel permeation chromatography (GPC) using polystyrene standards. If a poly(alkylene terephthalate) having a weight average molecular weight less than 10,000 atomic mass units is used, the mechanical properties of the articles molded from the composition can be unsatisfactory. On the other hand, if a poly(alkylene terephthalate) having a weight average molecular weight greater than 200,000 atomic mass units is used, the moldability can be insufficient. The poly(alkylene terephthalate) can also comprise a mixture of two or more poly(alkylene terephthalate)s having different intrinsic viscosities and/or weight average molecular weights.

In some embodiments, the poly(alkylene terephthalate) component comprises a modified poly(butylene terephthalate), that is, a PBT derived in part from poly(ethylene terephthalate) (PET), for example recycled PET from used soft drink bottles. The PET-derived PBT polyester (referred to herein for convenience as a "modified PB%") can be derived from a poly(ethylene terephthalate) component such as poly(ethylene terephthalate), a poly(ethylene terephthalate) copolymer, or a combination thereof. The modified PBT can further be derived from biomass-derived 1,4-butanediol, e.g., corn derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., carbon dioxide.

The modified PBT can have at least one residue derived from the poly(ethylene terephthalate) component. Such residue can include residue derived from one or more of ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexane dimethanol isomers, 1,4-cyclohexane dimethanol isomers, the cis isomer of 1,3-cyclohexane dimethanol, the cis isomer of 1,4-cyclohexane dimethanol, the trans isomer of 1,3-cyclohexane dimethanol, the trans isomer of 1,4-cyclohexane dimethanol, alkali salts, alkaline earth metal salts, including calcium, magnesium, sodium and potassium salts, phosphorous-containing compounds and anions, sulfur-containing compounds and anions, naphthalene dicarboxylic acids, 1,3-propanediol groups, and combinations thereof.

Depending on factors such as the type and relative amounts of poly(ethylene terephthalate) and poly(ethylene terephthalate) copolymers, the residue can include various combinations. For example, the residue can include mixtures of units derived from ethylene glycol groups and diethylene glycol groups. The residue can also include mixtures of units derived from ethylene glycol groups, diethylene glycol groups, and isophthalic acid groups. The residue derived from poly(ethylene terephthalate) can include the cis isomer of 1,3-cyclohexane dimethanol groups, the cis isomer of 1,4-cyclohexane dimethanol groups, the trans isomer of 1,3-cyclohexane dimethanol groups, the trans isomer of 1,4-cyclohexane dimethanol groups, and combinations thereof. The residue can also include a mixture of units derived from ethylene glycol groups, diethylene glycol groups, isophthalic acid groups, cis isomer of cyclohexane dimethanol groups, trans isomer of cyclohexane dimethanol groups, and combinations thereof. The residue derived from poly(ethylene terephthalate) can also include mixtures of units derived from ethylene glycol groups, diethylene glycol groups, and cobalt-containing compounds. Such cobalt-containing compound mixtures can also contain isophthalic acid groups.

The amount of the ethylene glycol groups, diethylene glycol groups, and isophthalic groups in the polymeric backbone of the modified PBT component can vary. The modified PBT ordinarily contain units derived from isophthalic acid in an amount that is at least 0.1 mole percent and can range from 0.1 to 10 mole percent. The modified PBT component can also contain units derived from ethylene glycol in an amount that is at least 0.1 mole percent and can range from 0.1 to 10 mole percent. The modified PBT component can also contain units derived from diethylene glycol in an amount of 0.1 to 10 mole percent. In some embodiments, the amount of units derived from butanediol is 95 to 99.8 mole percent. In some embodiments, the amount of units derived from terephthalic acid is 90 to 99.9 mole percent. Unless otherwise specified, all molar amounts of units derived from isophthalic acid and/or terephthalic acid are based on the total moles of units in the composition derived from diacids and/or diesters. Unless otherwise specified, all molar amounts of units derived from 1,4-butanediol, ethylene glycol, and diethylene glycol are based on the total moles of units in the composition derived from diol.

The total amount of the poly(ethylene terephthalate) component residue in the modified PBT can vary in amounts from 1.8 to 2.5 weight percent, or from 0.5 to 2 weight percent, or from 1 to 4 weight percent, based on the total weight of the modified PBT. When it is desirable to make a poly(butylene terephthalate) copolymer having a melting temperature $T_m$ that is at least 200° C., the total amount of diethylene glycol, ethylene glycol, and isophthalic acid groups should be within a certain range. As such, the total amount of the diethylene glycol, ethylene glycol, and isophthalic acid groups in the modified poly(butylene terephthalate) component can be more than 0 and less than or equal to 23 equivalents, relative to the total of 100 equivalents of diol and 100 equivalents of diacid groups in the modified PBT. The total amount of inorganic residues derived from the poly(ethylene terephthalate) can be present at more than 0 parts per million by weight (ppm) and up to 1000 ppm. Examples of such inorganic residues include antimony-containing compounds, germanium-containing compounds, titanium-containing compounds, cobalt-containing compounds, tin containing compounds, aluminum, aluminum salts, alkaline earth metal salts (including calcium and magnesium salts), alkali salts (including sodium and potassium salts), phosphorous-containing compounds and anions, sulfur-containing compounds and anions, and combinations thereof. The amounts of inorganic residues can be from 250 to 1000 ppm, more specifically from 500 to 1000 ppm.

Commercial examples of a modified PBT include those available under the trade name VALOX™ iQ Resin, manufactured by SABIC Innovative Plastics Company. The modified PBT can be derived from the poly(ethylene terephthalate) component by any method that involves depolymerization of the poly(ethylene terephthalate) component and polymerization of the depolymerized poly(ethylene terephthalate) component with 1,4-butanediol to provide the modified PBT. For example, the modified poly(butylene terephthalate) component can be made by a process that involves depolymerizing a poly(ethylene terephthalate) and/or a poly(ethylene terephthalate) copolymer, with a 1,4-butanediol component at a temperature from 180° C. to 230° C., under agitation, at a pressure that is at least atmospheric pressure in the presence of a catalyst component, at an elevated temperature, under an inert atmosphere, to produce a molten mixture containing an oligomer containing ethylene terephthalate moieties, an oligomer containing ethylene isophthalate moieties, an oligomer containing diethylene terephthalate moieties, an oligomer containing diethylene isophthalate moieties, an oligomer containing butylene terephthalate moieties, an oligomer containing butylene isophthalate moieties, a covalently bonded oligomeric moiety containing at least two of the foregoing moieties, 1,4-butanediol, ethylene glycol, or a combination thereof; and agitating the molten mixture at sub-atmospheric pressure and increasing the temperature of the molten mixture to an elevated temperature under conditions sufficient to form a modified PBT containing at least one residue derived from the poly(ethylene terephthalate) component.

The composition can comprise a combination of virgin poly(alkylene terephthalate) and modified poly(alkylene terephthalate), including a combination of virgin and modified poly(1,4-butylene terephthalate), the latter obtained from recycled poly(ethylene terephthalate) as described above.

The composition comprises the poly(alkylene terephthalate) in an amount of 5 to 35 weight percent, based on the total weight of the composition. Within this range, the poly(alkylene terephthalate) amount can be 10 to 30 weight percent, specifically 15 to 25 weight percent.

In addition to the aromatic polycarbonate, the block polycarbonate-polysiloxane, and the poly(alkylene terephthalate), the composition comprises a block polyestercarbonate. The block polyestercarbonate comprises at least one polyester block and at least one polycarbonate block. The polyester block comprises resorcinol ester repeat units having the structure

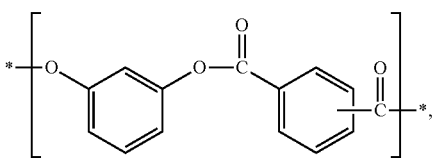

and the polycarbonate block comprises carbonate repeat units having the structure

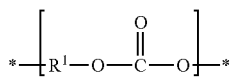

wherein at least 60 percent of the total number of $R^1$ groups are aromatic, and various specific embodiments of $R^1$ are described above.

In some embodiments, the polyester block comprises resorcinol ester repeat units having the structures

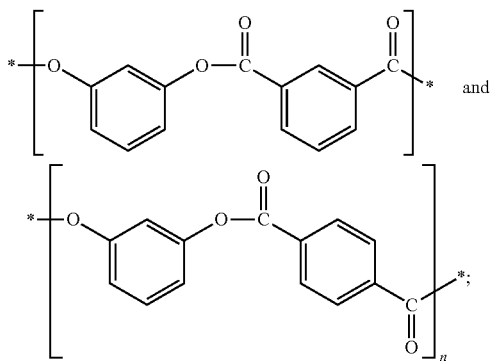
and and the polycarbonate block comprises carbonate repeat units having the structure

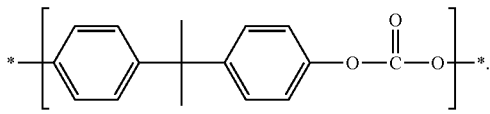

The composition comprises the block polyestercarbonate in an amount of 5 to 50 weight percent, based on the total weight of the composition. Within this range, the block polyestercarbonate amount can be 5 to 40 weight percent, specifically 10 to 35 weight percent, even more specifically 15 to 35 weight percent.

In addition to the aromatic polycarbonate, the block polycarbonate-polysiloxane, the poly(alkylene terephthalate), and the block polyestercarbonate, the composition comprises an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

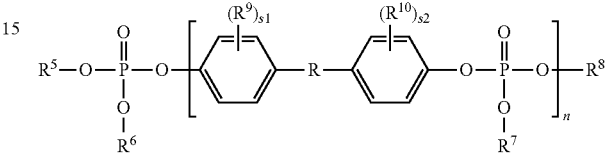

wherein R is independently at each occurrence a $C_1$-$C_{12}$ alkylene group; $R^9$ and $R^{10}$ are independently at each occurrence a $C_1$-$C_5$ alkyl group; $R^5$, $R^6$, and $R^7$ are independently a $C_1$-$C_{12}$ hydrocarbyl group; $R^7$ is independently at each occurrence a $C_1$-$C_{12}$ hydrocarbyl group; n is 1 to 25; and s1 and s2 are independently an integer equal to 0, 1, or 2. In some embodiments $OR^5$, $OR^6$, $OR^7$ and $OR^8$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A. In some embodiments, the organophosphate ester comprises bisphenol A bis(diphenyl phosphate).

The composition comprises the organophosphate ester in an amount of 4 to 20 weight percent, based on the total weight of the composition. Within this range, the organophosphate ester amount can be 5 to 15 weight percent, specifically 6 to 12 weight percent, more specifically 7 to 10 weight percent.

The composition can, optionally, comprise one or more flame retardants in addition to the organophosphate ester. Such flame retardants can include metal dialkylphosphinates (such as aluminum tris(diethylphosphinate)), melamine-containing flame retardants (such as melamine phosphate, melamine pyrophosphate, melamine polyphosphate, and melamine cyanurate), metal hydroxides (such as magnesium hydroxide, aluminum hydroxide, and cobalt hydroxide), and combinations thereof. When present, such additional flame retardants can be used in an amount of 1 to 10 weight percent, based on the total weight of the composition.

The composition can, optionally, further comprise one or more additives, including flow modifiers, antioxidants, heat stabilizers, light stabilizers, ultraviolet (UV) light stabilizers, UV absorbing additives, plasticizers, lubricants, mold release agents, antistatic agents, anti-fog agents, antimicrobial agents, surface effect additives, radiation stabilizers, anti-drip agents (e.g., a styrene-acrylonitrile copolymer-encapsulated polytetrafluoroethylene (TSAN)), and combinations thereof. In general, the additives, when present, are used in a total amount of less than or equal to 5 weight percent, based on the total weight of the composition. Within this limit, the additives can be used in a total amount of less than or equal to 2 weight percent, specifically less than or equal to 1.5 weight percent.

The composition can, optionally minimize or exclude impact modifiers. Impact modifiers include, for example, natural rubber, fluoroelastomers, ethylene-propylene rubbers (EPR), ethylene-butene rubbers, ethylene-propylene-diene monomer rubbers (EPDM), acrylate rubbers, hydrogenated nitrile rubbers (HNBR), silicone elastomers, styrene-butadiene-styrene block copolymers (SBS), styrene-butadiene rubbers (SBR), styrene-(ethylene-butene)-styrene block copolymers (SEBS), styrene-isoprene-styrene block copolymers (SIS), styrene-(ethylene-propylene)-styrene block copolymers (SEPS), acrylonitrile-butadiene-styrene copolymers (ABS, including bulk ABS and high-rubber graft ABS), acrylonitrile-ethylene-propylene-diene-styrene copolymers (AES), methyl methacrylate-butadiene-styrene block copolymers (MBS), and combinations thereof. In some embodiments, the composition comprises 0 to 1 weight percent of impact modifiers. In some embodiments, the composition excludes impact modifiers.

The composition can, optionally, minimize or exclude fillers, including reinforcing fillers (such as glass fibers, talc, mica, and wollastonite), and non-reinforcing fillers (such as silica and alumina). In some embodiments, the composition comprises 0 to 1 weight percent of reinforcing fillers. In some embodiments, the composition excludes reinforcing fillers. In the context of the minimizing or excluding fillers, the metal hydroxides described above in the context of flame retardants are considered fillers.

The composition can, optionally, minimize or exclude polymers other than those described above as required or optional. Thus, in some embodiments, the composition comprises 0 to 1 weight percent of any polymer other than the aromatic polycarbonate, the block polycarbonate-polysiloxane, the poly(alkylene terephthalate), the block polyestercarbonate, and, optionally, up to 2 weight percent of a poly(styrene-acrylonitrile)-encapsulated polytetrafluoroethylene. In some embodiments, the composition excludes any polymer other than the aromatic polycarbonate, the block polycarbonate-polysiloxane, the poly(alkylene terephthalate), the block polyestercarbonate, and, optionally, up to 2 weight percent of a poly(styrene-acrylonitrile)-encapsulated polytetrafluoroethylene.

In a specific embodiment of the composition, it comprises 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

In a very specific embodiment of the composition, the aromatic polycarbonate comprises repeat units having the structure

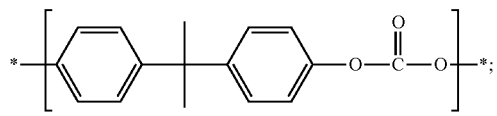

the block polycarbonate-polysiloxane comprises, based on the weight of the block polycarbonate-polysiloxane, 70 to 90 weight percent of carbonate units of the formula

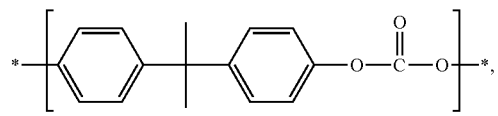

and 10 to 30 weight percent of dimethylsiloxane units; the poly(alkylene terephthalate) comprises poly(butylene terephthalate); the block polyestercarbonate comprises a polyester block comprising resorcinol ester repeat units having the structures

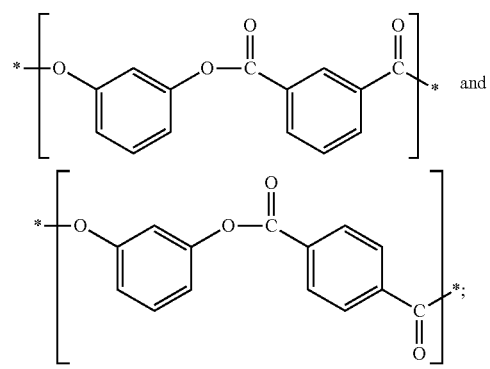

and a polycarbonate block comprising carbonate repeat units having the structure

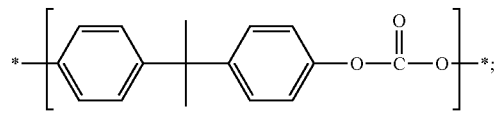

the organophosphate ester comprises bisphenol A bis(diphenyl phosphate); and the composition comprises 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

The composition is useful for fabricating articles, including components of household appliances (including microwave ovens, refrigerators, freezers, dishwashers, and laundry washers and dryers), components of office equipment (including printers and photocopiers), and components of consumer electronic devices (including televisions, computer gaming consoles, mobile phones). The composition is also useful for forming single-wall and multi-wall sheets. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used.

All of the variations of the composition described above can be applied to the article.

In a very specific embodiment of the article, the aromatic polycarbonate comprises repeat units having the structure

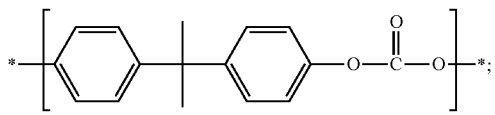

the block polycarbonate-polysiloxane comprises, based on the weight of the block polycarbonate-polysiloxane, 70 to 90 weight percent of carbonate units of the formula

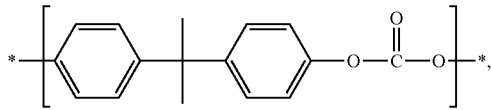

and 10 to 30 weight percent of dimethylsiloxane units; the poly(alkylene terephthalate) comprises poly(butylene terephthalate); the block polyestercarbonate comprises a polyester block comprising resorcinol ester repeat units having the structures

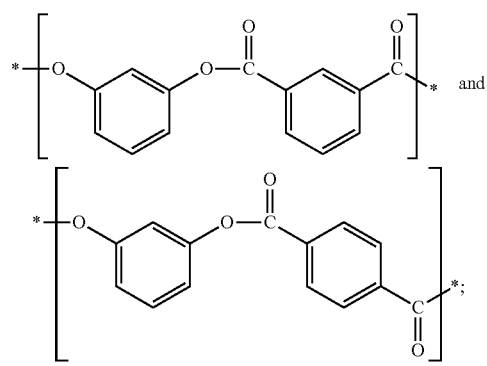

and a polycarbonate block comprising carbonate repeat units having the structure

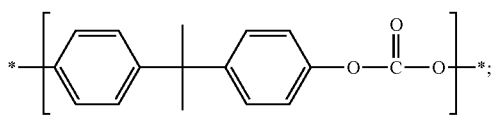

the organophosphate ester comprises bisphenol A bis(diphenyl phosphate); and the composition comprises 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

The invention includes at least the following embodiments.

Embodiment 1: A composition comprising, based on the total weight of the composition: 5 to 50 weight percent of an aromatic polycarbonate; 10 to 40 weight percent of a block polycarbonate-polysiloxane; 5 to 35 weight percent of a poly(alkylene terephthalate); 5 to 50 weight percent of a block polyestercarbonate comprising a polyester block comprising resorcinol ester repeat units having the structure

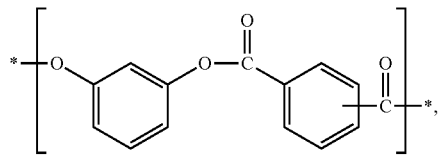

and a polycarbonate block comprising carbonate repeat units having the structure

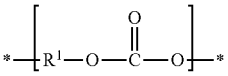

wherein at least 60 percent of the total number of $R^1$ groups are aromatic; and 4 to 20 weight percent of an organophosphate ester.

Embodiment 2: The composition of embodiment 1, wherein the aromatic polycarbonate comprises repeat units having the structure $$*{-}[R^1{-}O{-}\overset{O}{\underset{\|}{C}}{-}O]{-}*$$

wherein at least 60 percent of the total number of $R^1$ groups are aromatic.

Embodiment 3: The composition of embodiment 1 or 2, wherein the aromatic polycarbonate comprises repeat units having the structure

[structure]

Embodiment 4: The composition of any of embodiments 1-3, wherein the block polycarbonate-polysiloxane comprises a polycarbonate block comprising repeat units having the structure $$*{-}[R^1{-}O{-}\overset{O}{\underset{\|}{C}}{-}O]{-}*$$

wherein at least 60 percent of the total number of $R^1$ groups are aromatic, and a polysiloxane block comprising siloxane repeat units having the structure

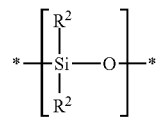

wherein each occurrence of $R^2$ is independently $C_1$-$C_{13}$ hydrocarbyl.

Embodiment 5: The composition of any of embodiments 1-4, wherein the block polycarbonate-polysiloxane comprises, based on the weight of the block polycarbonate-polysiloxane, 70 to 90 weight percent of carbonate units of the formula

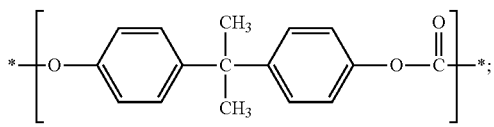

and 10 to 30 weight percent of dimethylsiloxane units.

Embodiment 6: The composition of any of embodiments 1-5, wherein the poly(alkylene terephthalate) comprises alkylene groups comprising ethylene, 1,3-propylene, 1,4-butylene, 1,5-pentylene, 1,6-hexylene, 1,4-cyclohexylene, 1,4-cyclohexanedimethylene, or a combination thereof.

Embodiment 7: The composition of any of embodiments 1-6, wherein the poly(alkylene terephthalate) comprises poly(butylene terephthalate).

Embodiment 8: The composition of any of embodiments 1-7, wherein the polyester block comprises resorcinol ester repeat units having the structures

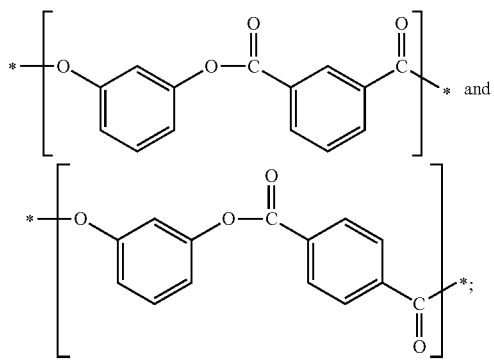

and wherein the polycarbonate block comprises carbonate repeat units having the structure

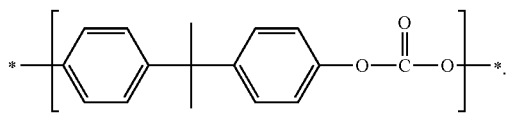

Embodiment 9: The composition of any of embodiments 1-8, comprising 0 to 1 weight percent of impact modifiers.

Embodiment 10: The composition of any of embodiments 1-9, comprising 0 to 1 weight percent of reinforcing fillers.

Embodiment 11: The composition of any of embodiments 1-10, comprising 0 to 1 weight percent of any polymer other than the aromatic polycarbonate, the block polycarbonate-polysiloxane, the poly(alkylene terephthalate), the block polyestercarbonate, and, optionally, up to 2 weight percent of a poly(styrene-acrylonitrile)-encapsulated polytetrafluoroethylene.

Embodiment 12: The composition of any of embodiments 1-11, comprising 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

Embodiment 13: The composition of embodiment 1, wherein the aromatic polycarbonate comprises repeat units having the structure

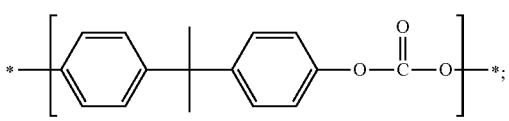

wherein the block polycarbonate-polysiloxane comprises, based on the weight of the block polycarbonate-polysiloxane, 70 to 90 weight percent of carbonate units of the formula

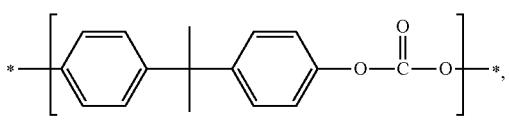

and 10 to 30 weight percent of dimethylsiloxane units; wherein the poly(alkylene terephthalate) comprises poly(butylene terephthalate); wherein the block polyestercarbonate comprises a polyester block comprising resorcinol ester repeat units having the structures

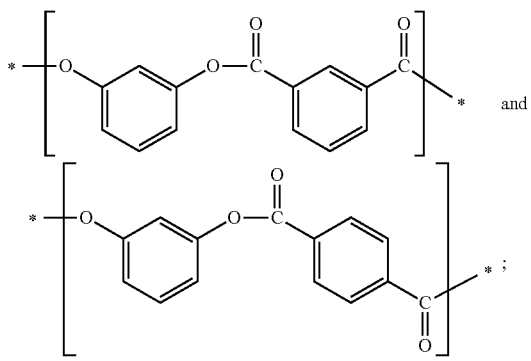

and a polycarbonate block comprising carbonate repeat units having the structure

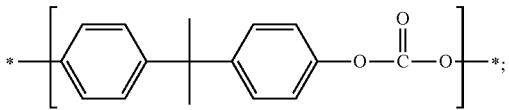

wherein the organophosphate ester comprises bisphenol A bis(diphenyl phosphate); and wherein the composition comprises 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

Embodiment 14: An article comprising a composition comprising, based on the total weight of the composition: 5 to 50 weight percent of an aromatic polycarbonate; 10 to 40 weight percent of a block polycarbonate-polysiloxane; 5 to 35 weight percent of a poly(alkylene terephthalate); 5 to 50 weight percent of a block polyestercarbonate comprising a polyester block comprising resorcinol ester repeat units having the structure

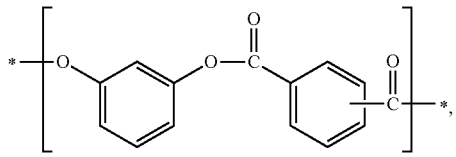

and a polycarbonate block comprising carbonate repeat units having the structure

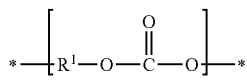

wherein at least 60 percent of the total number of $R^1$ groups are aromatic; and 4 to 20 weight percent of an organophosphate ester.

Embodiment 15: The article of embodiment 14, wherein the article is selected from a component of a household appliance, a component of office equipment, and a component of a consumer electronic device.

Embodiment 16: The article of embodiment 14 or 15, wherein the aromatic polycarbonate comprises repeat units having the structure

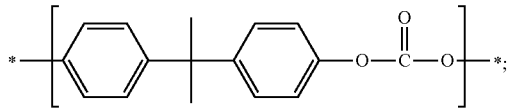

wherein the block polycarbonate-polysiloxane comprises, based on the weight of the block polycarbonate-polysiloxane, 70 to 90 weight percent of carbonate units of the formula

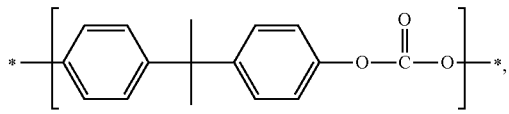

and 10 to 30 weight percent of dimethylsiloxane units; wherein the poly(alkylene terephthalate) comprises poly (butylene terephthalate); wherein the block polyestercarbonate comprises a polyester block comprising resorcinol ester repeat units having the structures

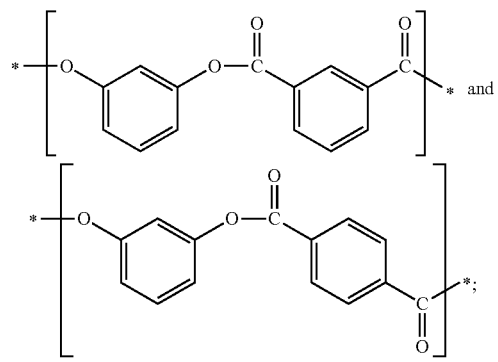

and a polycarbonate block comprising carbonate repeat units having the structure

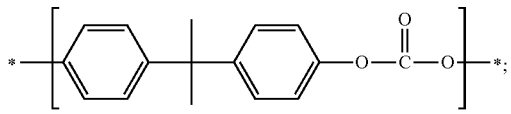

wherein the organophosphate ester comprises bisphenol A bis(diphenyl phosphate); and wherein the composition comprises 15 to 36 weight percent of the aromatic polycarbonate, 20 to 30 weight percent of the block polycarbonate-polysiloxane, 15 to 25 weight percent of the poly(alkylene terephthalate), 20 to 35 weight percent of the block polyestercarbonate, and 5 to 12 weight percent of the organophosphate ester.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES 1-6, COMPARATIVE EXAMPLES 1-5

Components used to compound the compositions are summarized in Table 1.

TABLE 1

| Component | Description |
|---|---|
| Polycarbonate | Para-cumylphenol end-capped bisphenol A polycarbonate, CAS Reg. No. 11211-39-3, having a melt flow rate of about 6 grams per 10 minutes at 300° C. and 1.2 kilogram load, and a weight average molecular weight of about 30,000; obtained from Sabic Innovative Plastics as LEXAN ™ ML5721 Resin. |
| PBT | Poly(1,4-butylene terephthalate), CAS Reg. No. 26062-94-2, having an intrinsic viscosity of 1.30 ± 0.02 deciliter per gram; obtained as PBT 1100-211X Resin from Chang Chun Plastics Co., LTD. |
| PC-Si | Poly(bisphenol A carbonate)-polydimethylsiloxane block copolymer, CAS Reg. No. 202483-49-6, having a polydimethylsiloxane content of about 20 weight percent, an average of about 45 siloxane repeat units per polysiloxane block, a melt volume flow rate of about 6 centimeter$^3$/10 minutes measured at 300° C. and 1.2 kilogram load |

TABLE 1-continued

| Component | Description |
|---|---|
| | according to ASTM D1238-04, a weight average molecular weight of about 30,000 atomic mass units, and being opaque in bulk form; preparable by the synthetic procedure of European Patent Application Publication No. 0 524 731 A1 of Hoover, page 5, Preparation 2. |
| MBS | Copolymer of methyl methacrylate, butadiene, and styrene, CAS Reg. No. 25053-09-2; obtained as PARALOID ™ EXL 2650A from Dow Chemical. |
| ITR-PC 1 | A block polyestercarbonate, CAS Reg. No. 235420-85-6, comprising about 81 mole percent resorcinol iso-/terephthalate ester linkages having an average of about 50 ester repeat units per polyester block, about 8 mole % resorcinol carbonate linkages, and about 11 mole % bisphenol A carbonate linkages, having a glass transition temperature of about 142° C. and a weight average molecular weight of about 21,000 atomic mass units; preparable according to the general procedure of U.S. Pat. No. 7,829,632 B2 to Chakravarti et al., column 14, line 1 to column 15, line 32. |
| ITR-PC 2 | A block polyestercarbonate, CAS Reg. No. 235420-85-6, comprising about 19 mole percent resorcinol iso-/terephthalate ester linkages having an average of about 33 ester repeat units per polyester block, about 6 mole % resorcinol carbonate linkages, and about 75 mole % bisphenol A carbonate linkages, having a glass transition temperature of about 136° C. and a weight average molecular weight of about 31,000 atomic mass units; preparable according to the general procedure of U.S. Pat. No. 7,829,632 B2 to Chakravarti et al., column 14, line 1 to column 15, line 32. |
| BPADP | Bisphenol A bis(diphenyl phosphate), CAS Reg. No. 5945-33-5; obtained from Daihachi Chemical. |
| $ZnHPO_4$ | Monozinc phosphate ($ZnHPO_4$), CAS Reg. No. 13598-37-3; obtained as Z21-82 from Budenheim Iberica. |
| UVA | 2-(2'-hydroxy-5-t-octylphenyl)benzotriazole, CAS Reg. No. 3147-75-9, obtained as CYASORB ™ UV-5411 from CYTEC. |
| TSAN | Polytetrafluoroethylene, CAS Reg. No. 9002-84-0, 50 weight percent, encapsulated in poly(styrene-co-acrylonitrile), CAS Reg. No. 9003-54-7, 50 weight percent; obtained as CYCOLAC ™ INP449 Resin from SABIC Innovative Plastics. |
| Antioxidant | Tetrakis(methylene(3,5-di-tert-butyl-4-hydroxyhydrocinnamate)methane, CAS Reg. No. 6683-19-8; obtained as IRGANOX ™ 1010 from BASF. |

Compositions were prepared by dry-blending all ingredients except for the liquid organophosphate ester BPADP, and feeding the resulting dry blend to the feed throat of a twin-screw extruder. BPADP was injected into the composition in a middle zone of the extruder. Typical extruder operating conditions included a screw rotation rate of 380 rotations per minute, a throughput of 50 kilograms/hour, and a temperature profile of 100° C./238° C./238° C./242° C./242° C./242° C./242° C./252° C./252° C./250° C. from feed throat to die. The extrudate was pelletized and dried at 120° C. for 4 hours before use for injection molding test samples. Injection molding was conducted with a barrel temperature of 250° C. and a mold temperature of 80° C.

Chemical resistance of the compositions was evaluated in two ways. First, in a visual inspection test, pellets were immersed in chloroform for 24 hours at 23° C. before being filtered and dried at room temperature. The morphology and shape of the chloroform-exposed pellets were differentiated into four grades by visual inspection, with grade "A" meaning that the pellets appeared intact, grade "B" meaning that the pellets appeared slightly eroded, grade "C" meaning that the pellets appeared severely eroded and were very sticky to the touch, and grade "D" meaning that the pellets completely dissolved in the chloroform. In a second chemical resistance test, before and after exposure to sunscreen under strain, tensile stress at break values, expressed in units of megapascals, were determined according to ASTM D638-10 at 23° C. using a Type I tensile bar, a gage length of 50 millimeters, and a test speed of 5 millimeters/minute. The sunscreen test was utilized because many hand-held electronic devices are exposed to sunscreen. The sunscreen contained the active ingredients 1 weight percent avobenzone (1-(4-Methoxyphenyl)-3-(4-tert-butylphenyl)propane-1,3-dione; CAS Reg. No. 70356-09-1), 10 weight percent homosalate (3,3,5-Trimethylcyclohexyl 2-hydroxybenzoate; CAS Reg. No. 118-56-9), 5 weight percent octisalate (octyl salicylate; CAS Reg. No. 118-60-5), 0.8 weight percent octocrylene (2-ethylhexyl 2-cyano-3,3-diphenyl-2-propenoate; CAS Reg. No. 6197-30-4), and 4 weight percent oxybenzone (2-Hydroxy-4-methoxyphenyl)-phenylmethanone; CAS Reg. No. 131-57-7); and ingredients including water and alcohol derivatives. Tensile bars were clamped to a semicircular jig to impart a constant applied strain of 0.5 percent or 1.0 percent. The strained bars were exposed to the sunscreen (SPF30) for 24 hours. The tensile stress retention was then calculated by comparison of the tensile stress values before and after the chemical treatment.

Melt flow values, expressed in units of grams per 10 minutes, were determined according to ASTM D1238-13 at 265° C. and 5 kilogram load. Notched Izod impact strength values, expressed in units of joules/meter, were determined according to ASTM D256-10 at 23° C. using bar dimensions of 63.5 by 12.7 by 3.2 millimeters. Vicat softening temperature values, expressed in units of degree centigrade, were determined according to ASTM D1525-09 using a load of 50 Newtons, a heating rate of 120° C. per hour, and bar dimensions of 63.5 by 12.7 by 3.2 millimeters.

Flame retardancy of injection molded flame bars was determined according to Underwriter's Laboratory Bulletin 94 "Tests for Flammability of Plastic Materials, UL 94", 20 mm Vertical Burning Flame Test. Before testing, flame bars with a thickness of 1.5 millimeters were conditioned at 23° C. and 50% relative humidity for at least 48 hours. In the UL 94 20 mm Vertical Burning Flame Test, a set of five flame bars was tested. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for each individual specimen must have been less than or equal to 10 seconds; and the total afterflame time for all five specimens (0 plus t2 for all five specimens) must have been less than or equal to 50 seconds; and the second afterflame time plus the afterglow time for each individual specimen (t2+t3) must have been less than or equal to 30 seconds; and no specimen can have flamed or glowed up to the holding clamp; and the cotton indicator cannot have been ignited by flaming particles or drops. To achieve a rating of V-1, the afterflame times t1 and t2 for each individual specimen must have been less than or equal to 30 seconds; and the total afterflame time for all five specimens (0 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; and the cotton indicator cannot have been ignited by flaming particles or drops. To achieve a rating of V-2, the afterflame times t1 and t2 for each individual specimen must have been less than or equal to 30 seconds; and the total afterflame time for all five specimens (0 plus t2 for all five specimens) must have been less than or equal to 250 seconds; and the second afterflame time plus the afterglow time for each individual specimen (t2+t3) must have been less than or equal to 60 seconds; and no specimen can have flamed or glowed up to the holding clamp; but the cotton indicator can have been ignited by flaming particles or drops. Compositions not achieving a rating of V-2 were considered to have failed.

The results, presented in Table 2, show that inventive Examples 1-6, each containing polycarbonate, polyester, block polycarbonate-polysiloxane, block polyestercarbonate, and organophosphate ester, exhibited chemical resistance grades of A or B in the chloroform exposure test, and tensile strength retentions ranging from 77 to 100 percent in the sunscreen exposure test. Examples 1-6 all exhibited the top rating of V-0 in the UL 94 Vertical Burn Test.

Comparative Example 1, lacking the block polyestercarbonate, exhibited a chemical resistance grade of C in the chloroform exposure test. Comparative Examples 2 and 3, lacking polyester, exhibited chemical resistance grades of D in the chloroform exposure test and tensile strength retentions of zero percent in the sunscreen exposure test. Comparative Example 4, lacking the block polycarbonate-polysiloxane and including an impact-modifying copolymer of methyl methacrylate, butadiene, and styrene, failed the UL 94 Vertical Burn test. And Comparative Example 5, lacking the block polycarbonate-polysiloxane and the organophosphate flame retardant, also failed the UL 94 Vertical Burn test. Thus, only the inventive examples exhibited the desired combination of chemical resistance and flame retardancy, without substantially compromising melt flow, heat resistance, or impact strength.

TABLE 2

| | Ex. 1 | Ex. 2 | Ex. 3 | Ex. 4 | Ex. 5 | Ex. 6 |
|---|---|---|---|---|---|---|
| COMPONENTS | | | | | | |
| Polycarbonate | 35.13 | 25.13 | 15.13 | 35.13 | 25.13 | 15.13 |
| PBT | 20.00 | 20.00 | 20.00 | 20.00 | 20.00 | 20.00 |
| PC-Si | 25.00 | 25.00 | 25.00 | 25.00 | 25.00 | 25.00 |
| MBS | 0.00 | 0.00 | 0.00 | 0.00 | 0.00 | 0.00 |
| ITR-PC 1 | 10.00 | 20.00 | 30.00 | 0.00 | 0.00 | 0.00 |
| ITR-PC 2 | 0.00 | 0.00 | 0.00 | 10.00 | 20.00 | 30.00 |
| BPADP | 8.50 | 8.50 | 8.50 | 8.50 | 8.50 | 8.50 |
| ZnHPO$_4$ | 0.15 | 0.15 | 0.15 | 0.15 | 0.15 | 0.15 |
| UVA | 0.27 | 0.27 | 0.27 | 0.27 | 0.27 | 0.27 |
| TSAN | 0.80 | 0.80 | 0.80 | 0.80 | 0.80 | 0.80 |
| Antioxidant | 0.15 | 0.15 | 0.15 | 0.15 | 0.15 | 0.15 |
| PROPERTIES | | | | | | |
| MFR (g/10 min) | 31 | 35 | 35 | 29 | 30 | 31 |
| Notched Izod (J/m) | 549 | 631 | 417 | 425 | 526 | 413 |
| Vicat Temp. (° C.) | 100 | 91 | 87 | 99 | 95 | 90 |
| UL94 Rating at 1.5 mm | V-0 | V-0 | V-0 | V-0 | V-0 | V-0 |
| Chemical Resistance (Appearance) | B | A | A | B | A | A |
| ESCR TS Retention, 0.5% strain (%) | 100 | 80 | 93 | 77 | 94 | 80 |
| ESCR TS Retention, 1.0% strain (%) | 84 | 83 | 87 | 75 | 80 | 89 |

| | C. Ex. 1 | C. Ex. 2 | C. Ex. 3 | C. Ex. 4 | C. Ex. 5 |
|---|---|---|---|---|---|
| COMPONENTS | | | | | |
| Polycarbonate | 45.13 | 25.13 | 25.13 | 55.13 | 48.65 |
| PBT | 20.00 | 0.00 | 0.00 | 20.00 | 40.00 |
| PC-Si | 25.00 | 25.00 | 25.00 | 0.00 | 0.00 |
| MBS | 0.00 | 0.00 | 0.00 | 5.00 | 10.00 |
| ITR-PC 1 | 0.00 | 40.00 | 0.00 | 10.00 | 0.00 |
| ITR-PC 2 | 0.00 | 0.00 | 40.00 | 0.00 | 0.00 |
| BPADP | 8.50 | 8.50 | 8.50 | 8.50 | 0.00 |
| ZnHPO$_4$ | 0.15 | 0.15 | 0.15 | 0.15 | 0.15 |
| UVA | 0.27 | 0.27 | 0.27 | 0.27 | 0.27 |
| TSAN | 0.80 | 0.80 | 0.80 | 0.80 | 0.80 |
| Antioxidant | 0.15 | 0.15 | 0.15 | 0.15 | 0.15 |
| PROPERTIES | | | | | |
| MFR (g/10 min) | 30 | 28 | 24 | 33 | 22 |
| Notched Izod (J/m) | 448 | 537 | 887 | 574 | 841 |
| Vicat Temp. (° C.) | 103 | 110 | 113 | 101 | 126 |
| UL94 Rating at 1.5 mm | V-0 | V-0 | V-0 | Fail | Fail |
| Chemical Resistance (Appearance) | C | D | D | B | A |
| ESCR TS Retention, 0.5% strain (%) | 72 | 0 | 0 | 87 | 99 |
| ESCR TS Retention, 1.0% strain (%) | 68 | 0 | 0 | 73 | 86 |

The invention claimed is:

1. A composition comprising, based on the total weight of the composition:

5 to 50 weight percent of an aromatic polycarbonate;

10 to 40 weight percent of a block polycarbonate-polysiloxane;

5 to 35 weight percent of a poly(alkylene terephthalate);

5 to 50 weight percent of a block polyestercarbonate comprising a polyester block comprising resorcinol ester repeat units having the structure

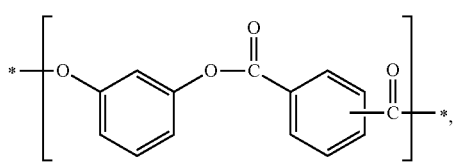

and
a polycarbonate block comprising carbonate repeat units having the structure

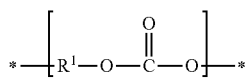

wherein at least 60 percent of the total number of $R^1$ groups are aromatic; and
4 to 20 weight percent of an organophosphate ester.

2. The composition of claim 1, wherein the aromatic polycarbonate comprises repeat units having the structure

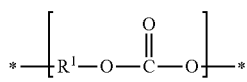

wherein at least 60 percent of the total number of $R^1$ groups are aromatic.

3. The composition of claim 1, wherein the aromatic polycarbonate comprises repeat units having the structure

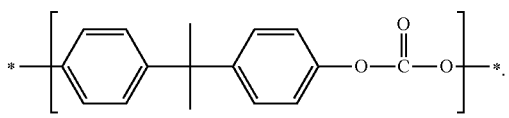

4. The composition of claim 1, wherein the block polycarbonate-polysiloxane comprises
a polycarbonate block comprising repeat units having the structure

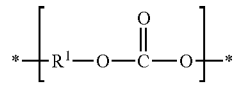

wherein at least 60 percent of the total number of $R^1$ groups are aromatic, and
a polysiloxane block comprising siloxane repeat units having the structure

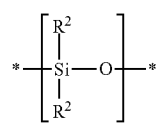

wherein each occurrence of $R^2$ is independently $C_1$-$C_{13}$ hydrocarbyl.

5. The composition of claim 1, wherein the block polycarbonate-polysiloxane comprises, based on the weight of the block polycarbonate-polysiloxane, 70 to 90 weight percent of carbonate units of the formula

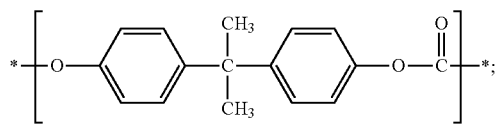

and
10 to 30 weight percent of dimethylsiloxane units.

6. The composition of claim 1, wherein the poly(alkylene terephthalate) comprises alkylene groups comprising ethylene, 1,3-propylene, 1,4-butylene, 1,5-pentylene, 1,6-hexylene, 1,4-cyclohexylene, 1,4-cyclohexanedimethylene, or a combination thereof.

7. The composition of claim 1, wherein the poly(alkylene terephthalate) comprises poly(butylene terephthalate).

8. The composition of claim 1, wherein the polyester block comprises resorcinol ester repeat units having the structures

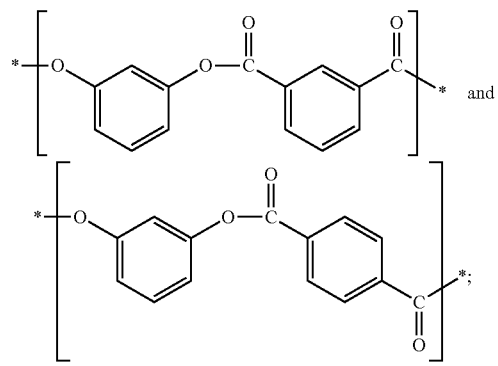

and
wherein the polycarbonate block comprises carbonate repeat units having the structure

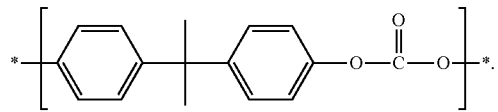

9. The composition of claim 1, comprising 0 to 1 weight percent of impact modifiers.

10. The composition of claim 1, comprising 0 to 1 weight percent of reinforcing fillers.

11. The composition of claim 1, comprising 0 to 1 weight percent of any polymer other than the aromatic polycarbonate, the block polycarbonate-polysiloxane, the poly(alkylene terephthalate), the block polyestercarbonate, and, optionally, up to 2 weight percent of a poly(styrene-acrylonitrile)-encapsulated polytetrafluoroethylene.

12. The composition of claim 1, comprising
15 to 36 weight percent of the aromatic polycarbonate,
20 to 30 weight percent of the block polycarbonate-polysiloxane,
15 to 25 weight percent of the poly(alkylene terephthalate),
20 to 35 weight percent of the block polyestercarbonate, and
5 to 12 weight percent of the organophosphate ester.

13. The composition of claim 1,
wherein the aromatic polycarbonate comprises repeat units having the structure

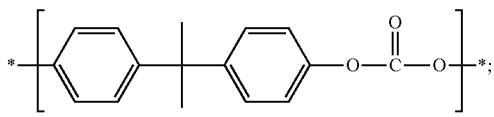

wherein the block polycarbonate-polysiloxane comprises, based on the weight of the block polycarbonate-polysiloxane, 70 to 90 weight percent of carbonate units of the formula

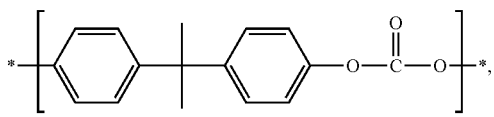

and
10 to 30 weight percent of dimethylsiloxane units;
wherein the poly(alkylene terephthalate) comprises poly(butylene terephthalate);
wherein the block polyestercarbonate comprises a polyester block comprising resorcinol ester repeat units having the structures

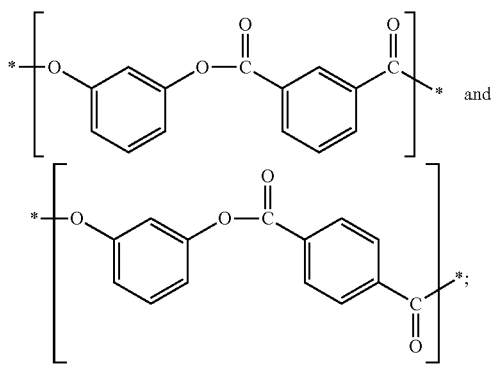

and
a polycarbonate block comprising carbonate repeat units having the structure

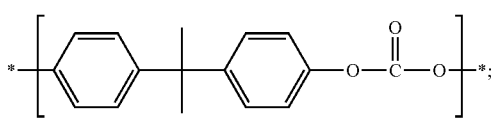

wherein the organophosphate ester comprises bisphenol A bis(diphenyl phosphate); and
wherein the composition comprises
   15 to 36 weight percent of the aromatic polycarbonate,
   20 to 30 weight percent of the block polycarbonate-polysiloxane,
   15 to 25 weight percent of the poly(alkylene terephthalate),
   20 to 35 weight percent of the block polyestercarbonate, and
   5 to 12 weight percent of the organophosphate ester.

14. An article comprising a composition comprising, based on the total weight of the composition:
   5 to 50 weight percent of an aromatic polycarbonate;
   10 to 40 weight percent of a block polycarbonate-polysiloxane;
   5 to 35 weight percent of a poly(alkylene terephthalate);
   5 to 50 weight percent of a block polyestercarbonate comprising
      a polyester block comprising resorcinol ester repeat units having the structure

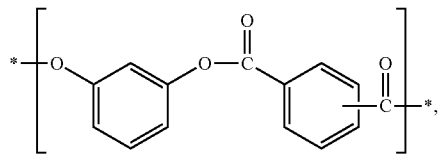

and
      a polycarbonate block comprising carbonate repeat units having the structure

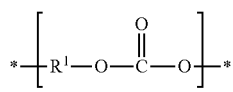

wherein at least 60 percent of the total number of $R^1$ groups are aromatic; and
   4 to 20 weight percent of an organophosphate ester.

15. The article of claim 14, wherein the article is selected from a component of a household appliance, a component of office equipment, and a component of a consumer electronic device.

16. The article of claim 14,
wherein the aromatic polycarbonate comprises repeat units having the structure

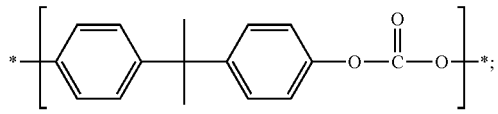

wherein the block polycarbonate-polysiloxane comprises, based on the weight of the block polycarbonate-polysiloxane, 70 to 90 weight percent of carbonate units of the formula

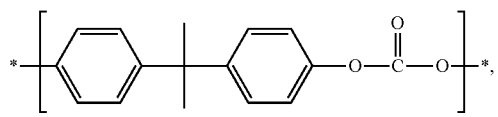

and
10 to 30 weight percent of dimethylsiloxane units;
wherein the poly(alkylene terephthalate) comprises poly(butylene terephthalate);
wherein the block polyestercarbonate comprises a polyester block comprising resorcinol ester repeat units having the structures

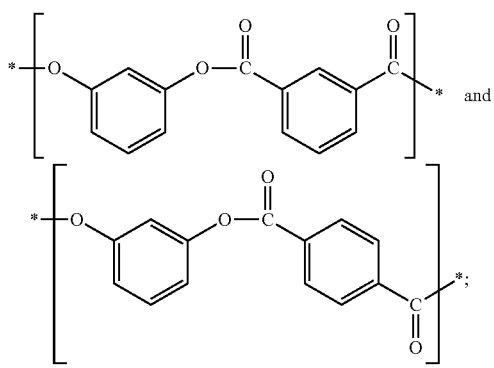

and
a polycarbonate block comprising carbonate repeat units having the structure

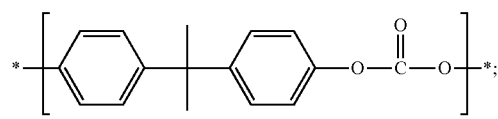

wherein the organophosphate ester comprises bisphenol A bis(diphenyl phosphate); and wherein the composition comprises
- 15 to 36 weight percent of the aromatic polycarbonate,
- 20 to 30 weight percent of the block polycarbonate-polysiloxane,
- 15 to 25 weight percent of the poly(alkylene terephthalate),
- 20 to 35 weight percent of the block polyestercarbonate, and
- 5 to 12 weight percent of the organophosphate ester.

* * * * *